United States Patent Office 3,248,344
Patented Apr. 26, 1966

3,248,344
METHOD OF ACTIVATING OXIDATION
CATALYST COMPOSITIONS
George R. Donaldson, Barrington, Ill., assignor to Universal Oil Products Company, Des Plaines, Ill., a corporation of Delaware
No Drawing. Filed Dec. 21, 1962, Ser. No. 246,321
8 Claims. (Cl. 252—466)

The present invention relates to an improved oxidation catalyst for the combustion of trace quantities of oxygen at ambient temperatures and for gas purification, as well as to the means for activating an oxidation catalyst to provide improved combustion characteristics.

The use of platinum or palladium and various non-precious metals as catalytic components for the combustion of volatile materials, gas purification, oxygen removal, etc., is well recognized in the catalytic art; however, the usual forms of oxidation catalysts, including the precious metal coatings, are not sufficiently active as to provide for the combustion of oxygen in trace quantities at low temperatures. The pretreatment of ammonia synthesis gas to remove oxygen is highly desirable in connection with ammonia synthesis plant operations. Thus, means providing for the rapid catalytic oxidation and removal of the trace quantities of oxygen in the feed stream provides a desirable processing scheme for its elimination.

It is also true that various types of activating procedures are utilized in connection with catalytic materials in order to increase their oxidizing efficiency and that such procedures have embodied oxidation and/or reduction steps. However, the usual known pretreatment or activation methods which have been disclosed in the catalystic art have not shown that sustained oxidation activity can be accomplished for the removal of trace quantities of oxygen at ambient conditions. For example, an all metal catalyst comprising a chrome-nickel alloy base material which had been plated with palladium and then subsequently pretreated at high temperature above about 600° F. with a heated air stream containing a combustible fuel such that catalytic oxidation took place on the catalyst surface, was subsequently used to effect the catalytic combustion of trace quantities of oxygen at ambient temperatures. The catalyst was active for a short period of time to effect the combustion of small quantities of oxygen in the test stream (approximately 25 p.p.m. of oxygen); however, continued use of the thus treated catalyst showed that there was a rapid loss of activity, with substantially no removal of the trace quantities of oxygen. A subsequent conditioning procedure involved the heating of the all metal catalyst, after the initial oxidation pretreatment, in the presence of a reducing stream containing a major proportion of hydrogen at the 500° F. level. This reducing treatment failed to show any improved oxidation activity of the catalyst for the removal of trace quantities of oxygen. However, a subsequent conditioning step on the catalyst utilized a reducing stream containing a major proportion of hydrogen at a temperature above about 1000° F. resulted in a reduced and activated catalyst that was highly efficient in effecting the removal of trace quantities of oxygen from a synthesis gas stream at ambient temperatures. The resulting reduced catalyst also appeared to have stability and was capable of continuing the active oxidation and removal of oxygen from the test feed stream for a sustained period of time. In other words, experimental work in connection with the oxidation catalysts has shown that there is a criticality to the temperature of the reducing treatment, in that it must be carried out at high temperature above the 500° F. level and apparently approximately 1000° F. or higher.

It may be stated that one object of the present invention is to provide an improved and activated oxidation catalyst which is useful for gas purification and is capable of oxidizing and removing trace quantities of oxygen from a gas stream at ambient conditions.

It is also an object of the present invention to provide a procedure for activating an oxidation catalyst to improve its incineration characteristics and to render it effective for the oxidation of trace quantities of oxygen over a sustained period of time.

While the improved oxidation characteristics and the improved method of catalyst activation appear to be particularly suitable for the metallic oxidation catalysts, it is not intended to limit the present invention to metallic catalysts alone, inasmuch as the refractory metal oxide base materials such as alumina, silica-alumina, silica, magnesia, silica-magnesia, etc., which have been activated with one or more activating components are within the scope of the present invention. Such activating components may comprise, for example, precious metals including the platinum group of metal, gold, silver, etc., or various known non-precious metal components having good oxidation characteristics, including iron, or the iron-group of metals, copper, vanadium, chromium, molybdenum, etc.

In a broad aspect, the present invention embodies an improved activated oxidation catalyst comprising a refractory base with a coating of a catalytically active metal component, with such catalyst having been activated subsequent to coating the base material with the activating metal component by a first oxidation treatment followed by a reduction treatment. The first oxidation treatment is carried out at a temperature something above 500° F. and generally within a range of above about 1000° F.

A preferred treatment for an all-metal catalyst provides for the burning of hydrocarbon vapors in excess air at a temperature above about 600° F. on the surface of the catalyst to produce an oxidized surface thereon, and the subsequent reduction step providing a reheating of the oxidized coated surface at a temperature above about 1000° F. in the presence of a gaseous atmosphere containing a major proportion of hydrogen, whereby to form a resulting reduced and activated oxidation catalyst.

As set forth briefly hereinbefore and as will be more fully set forth hereinafter, the present improved activating procedure involves two stages of treatment subsequent to the actual preparation of the catalytic material. In other words, subsequent to the coating of a metal alloy base material by the electrodeposition of the active oxidizing component, or alternatively, the compositing of a refractory metal oxide base material with one or more activating metal components, involves a preliminary oxidizing treatment where excess air and a suitable burnable fuel stream, such as hydrocarbon vapors, is passed at high temperatures over the surface of the catalyst until it is apparent that catalytic oxidation takes place on the surface of the catalyst, with such treatment being followed by a subsequent reducing treatment involving high temperature exposure of the catalyst surface to a reducing stream for a sufficient period of time to effect complete reduction.

For refractory metal support materials, the various stainless steels, such as Chromel and Nichrome (which are trade names for alloys of nickel and chrome or nickel, chrome and iron) are preferentially used. The metal may be used in the form of wire, screen, ribbon or other desirable physical form and should be cleaned in a suitable conventional manner prior to the electrodeposition of the active metal coating. Such cleaning may involve immersions in a hot alkaline bath containing caustic soda, silicates and phosphates with surface active agents, and the like. The metal coating to provide the catalytically active surface may be carried out by immersion plating or by electroplating. In the case of palladium and platinum, the deposition is preferably by electroplating, although it is not intended to limit the present invention to any one type of metal coating or coating process.

In a specific example, Chromel screen is precleaned by immersion in a hot solution of sodium orthosilicate with a surface active agent, such as a fatty acid soap, for example, sodium stearate, palmitate or oleate, or alkyl aryl sulfonate such as the sodium salt or dodecyl benzene sulfonic acid. It is thoroughly rinsed and is plated with a spongy palladium in a bath containing 0.5 gram of palladium chloride per liter and 4 ml. of 37% hydrochloric acid per liter. The plating solution is operated at 160° to 170° F. and the current density is such that a uniform coating of spongy palladium approximately 0.5 millimeter in thickness is deposited within one to three minutes. Pure graphite anodes may be used, or alternatively, metallic palladium anodes which will serve to replenish palladium to the solution. After plating, the catalyst is carefully rinsed free of soluble materials and is heated to approximately 600° F. in an air stream containing volatile hydrocarbons such as hexane or other hydrocarbon fractions in concentrations less than the lower limit of explosibility, whereupon surface combustion takes place, thus conditioning the palladium coating for service and increasing its tenacity to the base metal.

As a second example, Nichrome wire, screen or mat is precleaned as before and immersed at 180° F. in a solution containing 0.8 gram per liter of palladium chloride and 6 ml. of 37% hydrochloric acid per liter. The solution is agitated gently for a period of up to three or four minutes or until the surface of the metal is uniformly coated with amorphous palladium. No electric current is applied, the deposition occurring by replacement of palladium by nickel and/or chromium which slowly dissolves from the base metal. The catalyst is rinsed as provided by a first stage of conditioning or activation by heating above 600° F. in a gas stream containing volatile hydrocarbons as hereinbefore set forth.

Active oxidation coatings formed of the precious metals may utilize mixtures of platinum and palladium chlorides in the electroplating process which will result in greater tenacity to the metal base material and extreme resistance to high temperatures. Other components, such as copper, cobalt, nickel, chromium, etc., may be included in the electroplating solution and deposited along with the noble metal active coating. Also other noble metals such as osmium, ruthenium, rhodium, iridium may be used alone or in combination with platinum or palladium to provide a desirable active oxidizing catalyst surface.

Palladium chyoride concentrations up to 10 grams per liter can be used, and hydrochloric acid concentrations up to 10 grams per liter. Temperatures on the order of 170° F. have been found to produce structures with optimum catalytic activity, although it is possible to obtain active deposits at all solution temperatures from the freezing point to the boiling point. Current density, temperature, palladium or platinum concentration and acidity are all interrelated, and the choice of conditions is partly dictated by the base metal used. Increasing the acidity, or the temperature will increase the rate of attack on the base metal by the acid in the solution, and thus the rate of deposition of noble metal by replacement. In electroplating, for a given set of conditions, the current density should be such that evolution of hydrogen, either by attack of the metal by acid or electrodeposition from solution does not occur. At the proper conditions, a uniform, adherent coating approximately 0.5 mm. in thickness will be deposited in a period of five minutes or less. In the event of the use of graphite anodes, chlorine which is evolved should be prevented from diffusing into the cathode zone by means of porous membranes.

The reduction step following the oxidizing pre-treatment on the catalyst surface, in a particular embodiment, has involved the use of a reducing gas stream that is similar to an ammonia synthesis gas. In other words, a gas stream containing a three to one (3:1) mole ratio of hydrogen to nitrogen was used at a temperature above about 1000° F. to effect reduction of the catalyst surface. Such synthesis gas stream may contain trace quantities of oxygen of from one to two mole percent of oxygen in the gas stream. The reducing treatment may be carried out for a period of time sufficient to effect sustained heating of the catalyst surface at above about the 1000° F. level, which time may be for one or more hours, depending upon the type and thickness of the catalyst bed which is being treated.

In the case of the non-metal catalyst, various catalytic composites which have oxidizing activity may be utilized; however, those catalysts which appear to provide improved oxidation and sustained activity as compared to the composites will be characterized by the fact that they contain at least one catalytically active metallic component and preferably one from the platinum group of metals.

The various catalytically active metallic components which may be composited with the refractory inorganic oxide carrier material, may comprise, for example, vanadium, chromium, molybdenum, tungsten, members of the iron-group, copper, silver, gold and the platinum-group metals of the Periodic Table. A particular metal may be used in and of itself, or in combination with any of the foregoing metals; however, platinum or palladium is preferably desired by reason of providing a sustained high activity. Thus a preferred catalyst to be employed for oxidizing a gaseous stream or for improving waste product streams, prior to their discharge into the atmosphere, may comprise the following: platinum, palladium, other noble metals such as iridium, ruthenium, and rhodium, various mixtures, including platinum-iron, platinum-cobalt, platinum-nickel, palladium-iron, palladium-cobalt, palladium-nickel, platinum-palladium, palladium-copper-cobalt, platinum - copper - lithium - cobalt, platinum - cobalt-copper, copper - cobalt - nickel - platinum, platinum-palladium - cobalt, magnesium - platinum, patinum - cobalt - magnesium, lithium - platinum - cobalt, copper-cobalt-lithium, etc. It is understood that the catalytic activity, thermal stability, lead stability, auto-intiating temperature, and other characteristics of the catalyst of the present invention, are not necessarily equivalent. Many of the specific catalytic composites discussed herein do not necessarily yield equivalent results when compared with the catalysts comprising two or more different metallic components.

In accordance with the present invention, the catalyst may utilize a special refractory inorganic oxide as the carrier material for the catalytically active metallic components hereinbefore set forth. Refractory inorganic oxides possess particular physical characteristics which readily permit adaption thereof to the environment encountered in the operation of a motor vehicle. For example, one desirable physical characteristic is that extremely high temperatures do not apparently affect the capability of the material to function as desired. The refractory inorganic oxide carrier material, for utilization in the catalyst of the present invention, may be manufactured by various suitable methods, including separate, successive or co-precipitation methods of manufacture; however, a final reducing treatment is beneficially utilized, as will be hereinafter brought out more fully, to effect sustained activity for waste gas oxidation catalysts. It appears that a final reduction treatment in lieu of an oxidation or calcination treatment gains better results in the use of the catalyst for oxidation reactions at ambient conditions.

The term "alumina" is intended to include porous aluminum oxide in the various states of hydration. In addition to alumina, the improved carrier may incorporate at least one other refractory inorganic oxide in conjunction with the alumina. Specifically, an oxide such as silica, or titania, zirconia, hafnia or a mixture of two or more of such oxides may be incorporated with the alumina. The addition or incorporation of any of these refractory inorganic oxides, with the alumina, is generally dependent upon the desire to add thereto certain physical and/or chemical characteristics. The added oxide, or oxides, may be present within the carrier material in an amount within the range of about 0.5% to about 20.0% by weight thereof. Intermediate quantities are preferred and will be normally within the range of about 1.0% to about 10.0% by weight. The additional oxide, or oxides, may be effectively incorporated with the alumina by adding a water soluble salt of the component into the solution from which the alumina is precipitated. However, the particular method employed for the manufacture of the alumina and other refractory material composited therewith, is not considered an essential feature of the present invention. The catalyst may taken the form of any desired shape such as spheres, pills, extrudates, powder, granules, cakes, etc. The preferred form of support is the sphere, and spheres of the improved carrier of this invention may be continuously manufactured by the well known oil drop method, following the procedure described in U.S. Patent No. 2,630,314 issued to James Hoekstra. Regardless of the method of manufacturing the refractory inorganic oxide particles, such particles are generally subjected to specific aging treatments. In one embodiment, the refractory material may be prepared by effecting such aging treatments under sufficient pressure to maintain water in a liquid phase, while aging under a temperature level in excess of about 210° F.

An acidic oxide, such as titania or zirconia, compounded with the alumina normally imparts some acidic properties to the catalytic support; however, where desired, a halogen or phosphorus may be combined with the composite support to provide a further acidic constituent, and may be added in any suitable manner, either before or after the incorporation of the catalytically active metallic component to the support. The addition of halogen is generally accomplished through the use of an acid such as hydrogen fluoride and/or hydrogen chloride, or volatile salts such as ammonium fluoride and/or ammonium chloride. The halogen may be incorporated into the alumina during the preparation of the latter, as where the refractory inorganic oxide is prepared from a halide-containing hydrosol. Such a method affords a convenient manner of compositing halogen while at the same time manufacturing the alumina. In still another method of manufacture, the halogen may be compositied with the refractory oxide during the impregnation thereof with the catalytically active metallic components.

Regardless of the particular refractory materials employed as a carrier for the active metallic component, and regardless of the particular method selected for the preparation of such carrier, the catalytically active metallic component may be added thereto in any suitable convenient manner.

The catalytically active metallic component utilized in the preparation of the catalysts for the oxidation reactions, or for the conversion of waste gases, will generally be present in the composite within the range of about 0.01% to about 20.0% by weight thereof. Where the metal component is selected from the platinum-group, the same will be present in an amount within the range of about 0.05% to about 2.0% by weight thereof. As hereinabove stated, the metallic components may be incorporated in any suitable manner. Where platinum or palladium is employed, by reason of its being a preferred activating component, it may be added to the carrier material by commingling the latter with an aqueous solution of chloroplatinic acid. Other water-soluble compounds of platinum, or of the other noble metal components, may be utilized within the impregnating solution, and include ammonium chloroplatinate, platinous chloride, platinic chloride, dinitrito-diamino-platinum, etc. Where the catalyst is to contain other metallic components, such as those hereinbefore set forth, the catalyst may be prepared by commingling water-soluble compounds of these components, particularly the nitrates, sulfates, chlorates, chlorides, carbonates, and soaking the particles of the inorganic refractory oxide therein followed by heating to form the corresponding oxides of the metallic components. Although the precise means by which the metallic component is combined with the refractory material is not known, it is believed that it exists in some physical association or chemical complex therewith. Thus, the active metal component may be present as such or as a chemical compound or in physical association with the refractory inorganic oxide, or with the other catalytically active metallic components or in some combination with both.

Other metallic components, either in conjunction with, or instead of, a precious metal component, will be present in an amount of from about 0.01% to about 30.0% by weight. Lower concentrations are preferred and lie within the range of about 1.0% to about 20.0% by weight, calculated as the oxides thereof.

For the non-metal catalysts, the first stage oxidation may be carried out by heating in excess air at a temperature above 600° F. and generally above about 1000° F. Preconditioning may also be carried out in the same manner as that set forth for the all-metal catalysts by utilizing a stream containing excess air and a suitable quantity of hydrocarbon vapors or other fuel to effect catalytic oxidation over the surface of the catalyst at a temperature above about 600° F., and generally to above about 1000° F. Similarly, the second stage reducing treatment may be carried out with the catalytic material by utilizing a stream rich in hydrogen at a temperature above about 1000° F. for a period of time sufficient to effect complete reduction of the catalyst surfaces whereby to assure maintaining a finally reduced and activated oxidation catalyst which will be stable over a long period of time in effecting the removal of trace quantities of oxygen at ambient conditions.

*Example I*

In this example, sixteen 1¼ inch thick by approximately 3 inch diameter electroplated alloy mats or elements were prepared for test purposes. Such mats were formed of crinkled chrome-nickel alloy ribbon and electroplated with palladium and copper, with the copper comprising approximately 1% of the palladium-copper coating. Each of the mats were also preconditioned by an oxidation treatment which comprises heating them in an air stream containing hexane, in a concentration below the lower explosive limit, at a temperature of about 700° to 1000° F. until it was observed that catalytic oxidation of the entrained fuel was taking place on the surface of the catalyst.

In the test apparatus, the sixteen mats were stacked within one end of a 3 inch Schedule 40 pipe which was approximately 54" long. An approximate 24 inch long section of the pipe was utilized as a gas inlet section and was filled with ¼ inch diameter alumina balls so that the gas to be oxidized was suitably diffused and distributed to the top of the series of catalytic elements. The reaction section of the pipe, containing the catalyst elements or mats, was provided with treated gas sample outlets between every other pair of mats such that test samples of treated streams could be withdrawn between pairs, i.e. the use of two, four, six, eight, ten, twelve, fourteen or sixteen catalytic mats could be tested in the test procedure.

In one test operation, a synthetically prepared mixed gas stream, containing hydrogen and nitrogen in a 3 to 1 mole ratio of hydrogen to nitrogen and approximately 25 p.p.m. of oxygen, was passed at a velocity of approximately 25 feet per minute and at a temperature in the range of from 80° to 90° F. through the entire sixteen catalyst beds. An analysis of the exhaust gas stream by the use of a Beckman oxygen analyzer indicated that there had been no conversion of the oxygen present in the gas stream.

*Example II*

In this example the test apparatus was the same as that used in connection with the foregoing Example I; however, prior to the test operation each of the catalytic mats or elements were treated for approximately eight hours at a temperature of approximately 500° F. with a reducing stream containing a 3 to 1 mole ratio of hydrogen to nitrogen and approximately a 1.25 mole percent of oxygen.

In a test operation using the thus reduced catalyst elements, a hydrogen-nitrogen synthesis gas stream, with 1.5% added oxygen, was introduced to the test pipe chamber at a velocity of 25 feet per minute and at a temperature of approximately 230° F. The analysis of the exit gas from the apparatus by the Beckman analyzer showed that there was 25 to 55 p.p.m. of oxygen still present in the exit stream, even though the test was carried out above normal ambient conditions.

*Example III*

In this test, the apparatus and procedure was similar to that carried out in connection with Example II; however, external heating was utilized around the test apparatus such that the catalyst bed temperature was approximately 480° F. The hydrogen-nitrogen synthesis gas stream passed through the beds in the test apparatus carried approximately 25 p.p.m. of added oxygen at a flow velocity at 25 feet per minute. An analysis of the exit gas stream indicated that there had been no removal of oxygen from the gas stream at the elevated temperature.

*Example IV*

In this example, each of the catalyst elements, as described in connection with Example I, subsequent to the oxidation of the catalyst surface in the presence of the hydrocarbon vapors, was subjected to reduction treatment. The reduction step embodied the passing of a hydrogen-nitrogen synthesis gas stream containing 1½% oxygen, at a rate of approximately 25 feet per minute, through each of the catalyst elements at a temperature of 1000° F. to 1100° F. range for a period of approximately 12 hours.

In a subsequent test run on a synthesis gas stream carrying 25 p.p.m. of oxygen at a velocity of 25 feet per minute and at a temperature of approximately 78° F., there was found to be substantially complete removal of the added oxygen in the exit gas stream, there being less than 1 p.p.m. at the outlet.

*Example V*

In a test operation equivalent to that set forth in the foregoing Example I, except with an increased velocity for the gas stream being passed through the reaction section such that the test velocity was 50 feet per minute, there was found substantially complete removal of the oxygen, with a lowering of the 25 p.p.m. of oxygen in the test stream to less than 1 p.p.m. at the outlet.

*Example VI*

In a still further test procedure carried out in a manner similar to that set forth in Examples IV and V, the test gas stream was passed through the catalyst beds at a rate of 100 feet per minute and at a temperature of approximately 78° F. Here again, the removal was substantially complete with oxygen being reduced from approximately 25 p.p.m. in the inlet stream to less than 1 p.p.m. in the exit stream.

*Example VII*

A series of tests were carried out utilizing the test apparatus, as described in Example I, and the activated catalyst elements which had been subjected to both the preliminary oxidation treatment and subsequent high temperature reducing treatment, as set forth in Example IV, so as to obtain data as to the efficiency of the treated catalyst in reducing trace quantities of oxygen in the test stream at ambient pressure and temperature conditions. In other words, analysis was made from each of the exit valves from the test apparatus so as to determine the extent of oxidation completed after the gas stream had progressed through successive pairs of catalyst beds. In one series of test runs the synthesis gas reactant stream was passed at a velocity of 25 feet per minute through the apparatus while in subsequent runs the stream was introduced at, respectively, 50 feet per minute and 100 feet per minute. In the particular data being set forth, the temperature conditions were somewhat below room temperature being in the 20° to 30° F. range. Also, in the various test runs the oxygen was added so as to provide approximately 25 p.p.m. in the resulting mixed stream, except for one run where oxygen was added in an amount to provide 100 p.p.m.

Reference may be made to the accompanying Table I which sets forth the results from four different test runs, as indicated under the respective columns A, B, C and D.

TABLE I

|  | A | B | C | D |
|---|---|---|---|---|
| Velocity | 25 ft./min. | 50 ft./min. | 50 ft./min. | 100 ft./min. |
| Temp. In | @ 26°–20° F. | @ 20° F. | @ 32° F. | @ 20°–26° F. |
| $O_2$ p.p.m. at Inlet | 20.5 | 25.5 | 100.0 | 25.3 |
| $O_2$ p.p.m. After— |  |  |  |  |
| Two 1¼″ Beds | 16.7 | 21.5 | 87.5 | 23.0 |
| Four 1¼″ Beds | 14.0 | 19.0 | 73.2 | 21.3 |
| Six 1¼″ Beds | 9.7 | 10.5 | 39.+ | -------- |
| Eight 1¼″ Beds | 5.3 | 7.0 | 19.6 | 11.6 |
| Ten 1¼″ Beds | 0.8 | 0.4 | 1.6 | 3.45 |
| Sixteen 1¼″ Beds | 0.5 | 0.5 | 1.4 | 0.9 |

In Run A, the 3:1 mole ratio of hydrogen to nitrogen synthesis gas stream, containing a 20.5 average p.p.m. of oxygen, was passed through the test apparatus at a velocity of 25 feet per minute and at a temperature of 16° to 20° F.

In Run B, the synthesis gas stream, containing 25.5 average p.p.m. of oxygen, was passed at a velocity of 50 feet per minute and at a temperature of about 20° F. through the test apparatus.

In Run C, the synthesis gas stream, containing 100 average p.p.m. of oxygen, was passed at a velocity of 50 feet per minute and at a temperature of about 32° F. through the test apparatus.

In Run D, the synthesis gas stream containing 25.3 average p.p.m. of oxygen, was passed at a velocity of 100 feet per minute and at a temperature of about 20° to 26° F. through the test apparatus.

The first row of figures in Table I, for each run, indicate the parts per million of oxygen in the respective inlet streams. The successive rows show the parts per million of oxygen in the exit gas stream from the apparatus after having passed through a varying number of successive pairs of stacked catalyst beds. In other words, the second row of figures in each column provides the p.p.m. of oxygen after the stream has passed through two 1¼ inch catalyst elements; the third row of figures shows the p.p.m. in the exit gas stream after having passed through four catalyst elements in each run; etc.

In all cases the analysis data indicates that less than about 1 p.p.m. of oxygen is left in the exit gas stream after having passed through the total series of stacked beds. In the case of Run C, where 100 p.p.m. of oxygen was added to the feed stream and said stream was passed through the unit at 50 feet per minute, the outlet showed 1.4 p.p.m. Also, from a study of the foregoing examples and test runs, it is quite evident that the oxidation catalyst after activation in the two-stage procedure embodying the preliminary oxidation of the catalyst surface and a subsequent reduction at the high temperature resulted in a stable active oxidation catalyst capable of readily removing trace quantities of oxygen from a feed stream at low temperature ambient conditions.

I claim as my invention:

1. A method for activating an oxidation catalyst having a coating of a catalytically active metal component selected from the group consisting of platinum, palladium and mixtures thereof to improve its oxidizing characteristics, which comprises, the steps of, firstly, burning hydrocarbon vapors in excess air at a temperature above about 600° F. on the surface of the catalyst to form an oxidized coating, and subsequently, heating such coated and treated catalyst at a temperature above about 1000° F. in the presence of a mixed gas stream containing a major proportion of hydrogen, whereby to effect a finally reduced and activated oxidation catalyst.

2. A method for activating an oxidation catalyst having a coating of catalytically active metal selected from the group consisting of platinum, palladium and mixtures thereof on a metal alloy base material to improve its oxidizing characteristics which comprises the steps of, firstly, burning hydrocarbon vapors in excess air at a temperature above 600° F. on the surface of the catalyst to form an oxidized coating, and subsequently, heating such coated and treated catalyst at a temperature above about 1000° F. in the presence of a mixed gas stream containing a major proportion of hydrogen whereby to effect a finally reduced and activated oxidation catalyst.

3. A method for activating an oxidation catalyst comprising a refractory metal oxide support having an active catalytic metal component selected from the group consisting of platinum, palladium and mixtures thereof composited therewith whereby to improve its oxidizing characteristics, which comprises the steps of, firstly, burning hydrocarbon vapors in excess air at a temperature above about 600° F. on the surface of the catalyst to form an oxidized coating, and subsequently, heating such coated and treated catalyst at a temperature above about 1000° F. in the presence of a mixed gas stream containing a major proportion of hydrogen whereby to effect a finally reduced and activated oxidation catalyst.

4. A method for activating an oxidation catalyst comprising a high temperature resistant metal alloy base material having an electrodeposited coating of amorphous metal selected from the group consisting of platinum, palladium and mixtures thereof, to improve its oxidizing characteristics and stability, which comprises the steps of, firstly, passing an air stream containing a hydrocarbon vapor in concentrations below the lower explosive limit at a temperature above about 600° F. and effecting combustion of the hydrocarbon vapor on the surface of said catalyst, and subsequently in a second stage, passing a reducing stream comprising a major proportion of hydrogen, a lesser proportion of nitrogen and less than about 2% oxygen, into contact with said catalyst at a temperature above about 1000° F. whereby to effect a finally reduced stable and active oxidation catalyst.

5. A method for activating an oxidation catalyst comprising a refractory metal oxide base material and having composited therewith a catalytically active metal component selected from the group consisting of platinum, palladium and mixtures thereof whereby to improve its oxidizing characteristics and stability which comprises firstly, passing an air stream containing a hydrocarbon vapor in concentrations below the lower explosive limit at a temperature above about 600° F. and effecting combustion of the hydrocarbon vapor on the surface of said catalyst, and subsequently in a second stage, passing a reducing stream comprising a major proportion of hydrogen, a lesser proportion of nitrogen and less than about 2% oxygen, into contact with said catalyst at a temperature above about 1000° F., whereby to effect a finally reduced stable and active oxidation catalyst.

6. The method of claim 5 further characterized in that said metal oxide base material comprises aluminum oxide and said metal component comprises palladium.

7. In the activation of a catalytic composite of a refractory base and a catalytically active metal component selected from the group consisting of platinum, palladium and mixtures thereof deposited on the base to improve its oxidizing characteristics, the steps of burning a hydrocarbon vapor in excess air at a temperature above about 600° F. on the surface of the composite to form an oxidized coating, and subsequently heating the thus treated composite at a temperature above about 1000° F. in the presence of hydrogen to form a reduced and activated oxidation catalyst.

8. In the activation of a catalytic composite of a chrome-nickel alloy base coated with palladium and copper to improve its oxidizing characteristics, the steps of burning a hydrocarbon vapor in excess air at a temperature above about 600° F. on the surface of the composite to form an oxidized coating, and subsequently heating the thus treated composite at a temperature above about 1000° F. in the presence of a mixed gas stream containing a major proportion of hydrogen to form a reduced and activated oxidation catalyst.

References Cited by the Examiner

UNITED STATES PATENTS

| 2,720,494 | 10/1955 | Suter et al. | 252—470 |
| 2,817,626 | 12/1957 | Mabry et al. | 252—470 X |

FOREIGN PATENTS

| 25,252 | 8/1912 | Great Britain. |

BENJAMIN HENKIN, *Primary Examiner.*

MAURICE A. BRINDISI, *Examiner.*